United States Patent [19]

Huang et al.

[11] Patent Number: 5,278,000
[45] Date of Patent: Jan. 11, 1994

[54] OVERCHARGE AND OVERDISCHARGE PROTECTION OF AMBIENT TEMPERATURE SECONDARY LITHIUM CELLS

[75] Inventors: Chen-kuo Huang, So. Pasadena; Subbarao Surampudi, Glendora; Alan I. Attia, Glendale; Gerald Halpert, Pasadena, all of Calif.

[73] Assignee: The United States of America as represented by the Administrator of the National Aeronautics and Space Administration, Washington, D.C.

[21] Appl. No.: 942,491

[22] Filed: Sep. 2, 1992

[51] Int. Cl.⁵ .......................................... H01M 10/48
[52] U.S. Cl. .................................... 429/91; 429/191; 429/194; 429/218
[58] Field of Search ............... 429/191, 194, 218, 223, 429/224, 91, 61, 90

[56] References Cited

U.S. PATENT DOCUMENTS

| | | | |
|---|---|---|---|
| 4,675,260 | 6/1987 | Sakurai et al. | 429/191 |
| 4,710,439 | 12/1987 | Tarscon | 429/194 |
| 4,751,157 | 5/1987 | Uchiyama et al. | 429/194 |
| 4,751,158 | 4/1988 | Uchiyama et al. | 429/194 |
| 4,857,423 | 8/1989 | Abraham et al. | 429/194 |
| 4,911,996 | 3/1990 | Holleck et al. | 429/194 |
| 4,934,922 | 6/1990 | Abraham et al. | 429/50 |
| 4,935,316 | 6/1990 | Redney | 429/194 |
| 4,965,150 | 10/1990 | Dahn et al. | 429/197 |
| 4,983,476 | 1/1991 | Slane et al. | 429/197 |
| 5,084,366 | 1/1992 | Toyoguchi | 429/224 |

*Primary Examiner*—Anthony Skapars
*Attorney, Agent, or Firm*—Thomas H. Jones; John H. Kusmiss; Guy M. Miller

[57] ABSTRACT

A cathode additive is provided for protecting an ambient temperature secondary lithium cell from overcharging or overdischarging. The cathode additive is chosen to create an upper voltage plateau which is slightly higher than a characteristic charge cutoff voltage of the cathode of the cell. The cathode additive additionally creates a lower voltage plateau which is slightly lower than the characteristic discharge cutoff voltage of the cell. Preferably the cathode additive is a transition metal oxide or a sulfide may, for example, include a mixture of $Li_2Mn_2O_4$ and $Li_{0.1}MoO_2$.

22 Claims, 3 Drawing Sheets 5,278,000

OVERCHARGE AND OVERDISCHARGE PROTECTION OF AMBIENT TEMPERATURE SECONDARY LITHIUM CELLS

ORIGIN OF THE INVENTION

The invention described herein was made in the performance of work under a NASA contract, and is subject to the provisions of Public Law 96-517 (35 U.S.C. Section 202) in which the Contractor has elected not to retain title.

TECHNICAL FIELD

The present invention generally relates to preventing overcharging and over-discharging of secondary battery cells, in particular, ambient temperature secondary lithium cells.

RELATED ART

Many applications require the use of secondary, i.e., rechargeable, battery cells having more than two cells connected in series. The individual cells in the battery may be subjected to inadvertent overcharging or overdischarging during cycling. Cells subjected to overcharge or overdischarge lose capacity irreversibly. Further, repeated overcharge and overdischarge of cells results in possible venting or exploding of cells. In particular, state of the art secondary lithium cells are very sensitive to overcharge and overdischarge. A mechanism to prevent both the overcharge and overdischarge of such cells is highly desirable for practical applications. Previously, electrolyte additives such as dimethyl ferrocene, dibutyl ferrocene, etc., were examined as possible candidates for protecting cells from overcharge. However, such electrolyte additives only protect cells from overcharge and do not effectively protect the cells from overdischarge. Further, electrolyte additives are effective at only very low rates of overcharge. Moreover, electrolyte additives are not effective in solid state batteries or polymeric electrolyte batteries, since additives to such batteries are not mobile, unlike additives in a liquid electrolyte battery.

Battery voltage indicators have also been proposed for protecting cells from overcharge and overdischarge by either terminating or reducing applied current. However, for multicell batteries, such external voltage indicators are not always effective, and a built-in overcharge and overdischarge protection mechanism may be necessary.

Specifically, built-in protection is preferable in cells of the type where cell voltage, which is governed by the difference of cathode and anode potential, does not show a plateau, FIG. 1, but instead changes as a function of charge and discharge state, FIG. 2. The latter occurs in, for example, Li—TiS$_2$ cells. In such cells, the terminal battery voltage may not necessarily reflect the actual individual cell status, even though some of the cells are being overcharged or overdischarged.

To illustrate, consider a secondary battery consisting of 10 cells in series where the discharge cutoff voltage is 10 volts (1 volt per cell) and the overcharge cutoff voltage is 27 volts (2.7 volts per cell). Upon discharge, the terminal voltage of the battery can be 10 volts without every cell being 1 volt. In other words, eight cells can each be at 1 volt, with the remaining two cells being 1.2 volts and 0.8 volt, respectively. Although the cell which has reached 0.8 volt is being overdischarged, this overdischarge is not detected by simply measuring the battery terminal voltage, as in the case of a battery with cells which exhibit cell voltage as a function of charge and discharge.

In cells which exhibit a voltage plateau in the charge and discharge behavior, the battery terminal voltage can provide an indication of the status of the cells. For example, if the discharge cutoff voltage is 10 volts (1 volt per cell), upon discharge, the battery terminal voltage will be less than 10 volts only if one or more of the cell voltages are less than 1 volt each. In such case, to avoid discharge abuse of the cell, one can measure the terminal voltage and terminate the current if the overall voltage indicates overdischarge. However, this solution is not practical for many applications, and is not applicable for batteries with changing cell voltages, as described above.

Exemplary patented systems directed to overcharge or overdischarge protection include U.S. Pat. No. 4,935,316 to Redey, which specifically addresses overdischarge protection of a cell system having plateau potentials for both anode and cathode. The method of Redey exploits a family of alloy materials which are added to the parent anode material to adjust the cathode and anode relative capacity. overdischarge protection is achieved either by reducing or terminating the operating current or, for deeply discharged cells, by using a Li$^+$—Li$^0$ shuttling mechanism. However, for batteries where either the cathode or anode material does not have a flat potential versus Li with composition change, the method of Redey is not effective.

In U.S. Pat. No. 4,935,316, an anode additive is employed for high temperature batteries.

U.S. Pat. No. 4,857,423 to Abraham et al. features the use of redox reagents, such as ferrocene, butylferrocene, etc., which are dissolved in nonaqueous electrolytes to provide overcharge protection for cells having alkali metal negative electrodes. The method of Abraham et al. does not address overdischarging. Moreover, for solid state batteries, the approach described by Abraham et al. does not even provide overcharge protection.

STATEMENT OF THE INVENTION

From the foregoing, it can be appreciated that there is a need to prevent overcharging and overdischarging of secondary lithium cells, particularly solid state secondary lithium cells.

This object, and the general purposes of the invention, may be achieved by the provision of a cathode additive for incorporating into a cathode of a lithium cell for preventing overcharging and overdischarging of the cell. The cathode additive is chosen to yield an upper voltage plateau slightly higher than a charge cutoff voltage of the cathode and for yielding a lower voltage plateau slightly lower than a discharge cutoff voltage of the cathode. By providing such upper and lower plateaus, any increase or decrease of the cell voltage to above or below the base cathode voltage range is achieved through action of the additive, rather than the base cathode material. In this manner, the base cathode material is protected from overcharge and overdischarge. In other words, the additive acts as the sink/source system for the electroactive species (lithium) to control the cell voltage both during overcharge and overdischarge. The cathode additive also functions as an end of discharge or end of charge indicator.

In accordance with a preferred embodiment, the cathode additive is a transition metal oxide or sulfide. In particular, the cathode additive may include $Li_xMn_2O_4$, $Li_xMoO_2$, $Li_xCoO_2$, $Li_xNiO_2$, and $Li_xM_yMn_{(2-y)}O_4$, wherein M is Co, Cr, or Fe, wherein x indicates a range of lithium titration, and y indicates a range of metal titration. Considering $Li_xMn_2O_4$, for example, if titration occurs until half of the $Mn_2O_4$ molecules include a lithium atom, then x=0.5. Typically, x ranges from slightly greater than 0 to 1 or 2, but may be higher as desired. In $Li_xM_yMn_{(2-y)}O_4$, y can range anywhere between 0 and 2. In one embodiment, the cathode additive comprises a mixture of $Li_2M_yO_4$ and $Li_{0.1}MoO_2$. In the preferred embodiment, the additive is employed with a multicell lithium battery of the type employing Li—$TiS_2$. However, the cathode additive is also effective in other secondary lithium cells such as Li—$MoS_2$, Li—$NbSe_3$, Li—$V_2O_5$, Li—$MnO_2$, and $Li_xC$-$Li_xCoO_2$ cells.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide overcharging and overdischarging protection for an ambient temperature secondary lithium cell.

Figure 1:
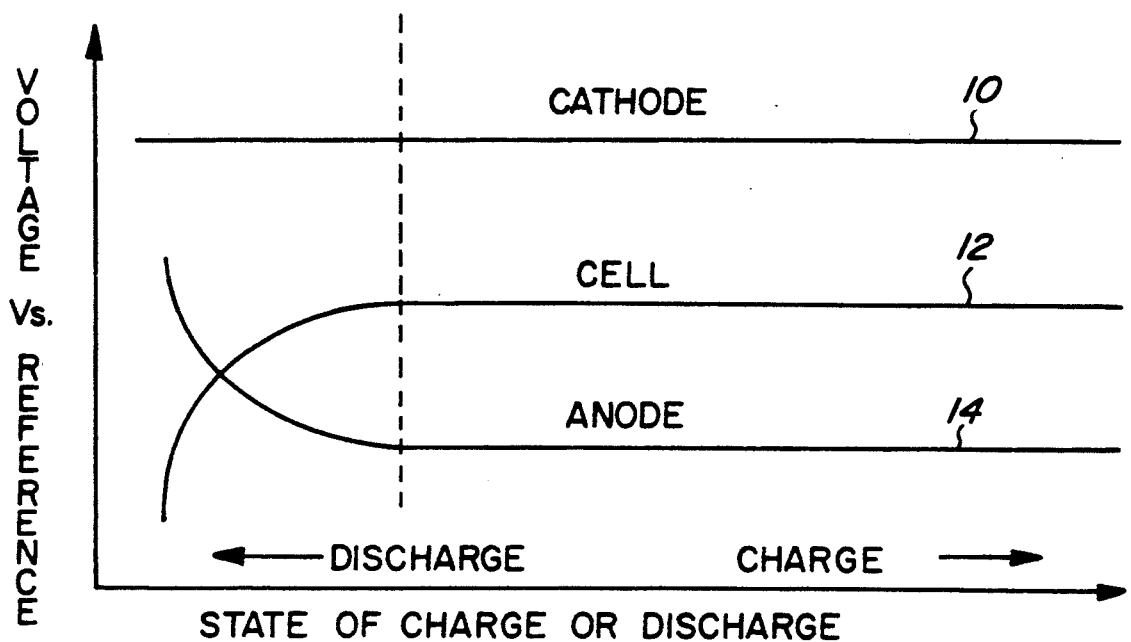
FIG. 1 is a schematic diagram representing cell voltage as a function of cell charge or discharge state for a cell exhibiting a plateau voltage.
Figure 2:
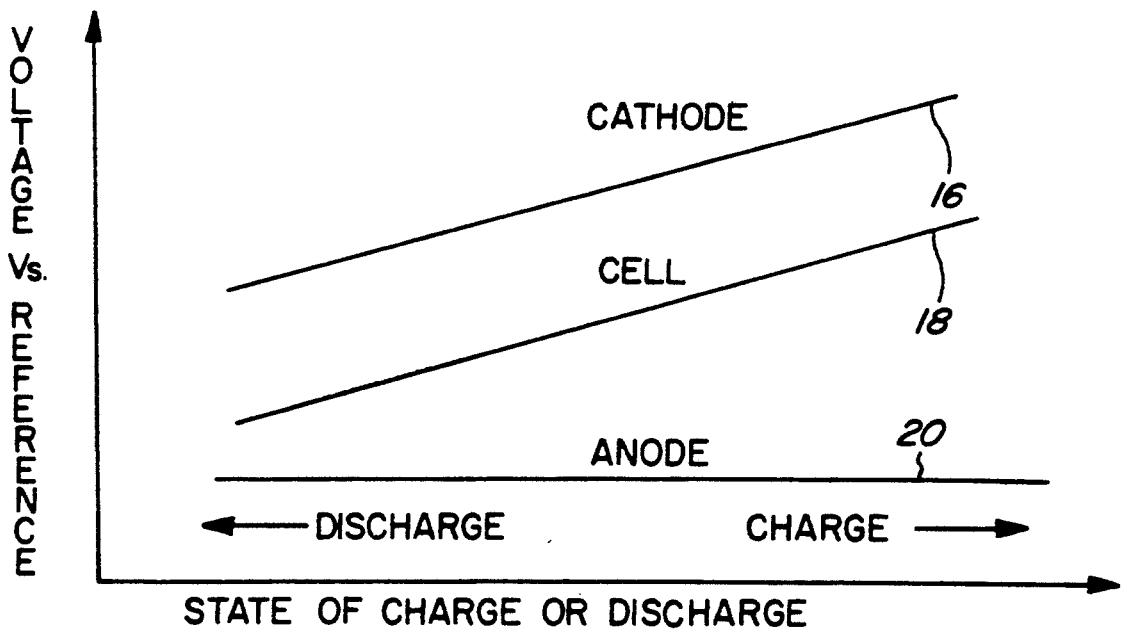
FIG. 2 is a schematic diagram of cell voltage as a function of cell charge or discharge state for a cell exhibiting a nonplateau voltage, i.e., a voltage changing with the amount of charge or discharge.
Figure 3:
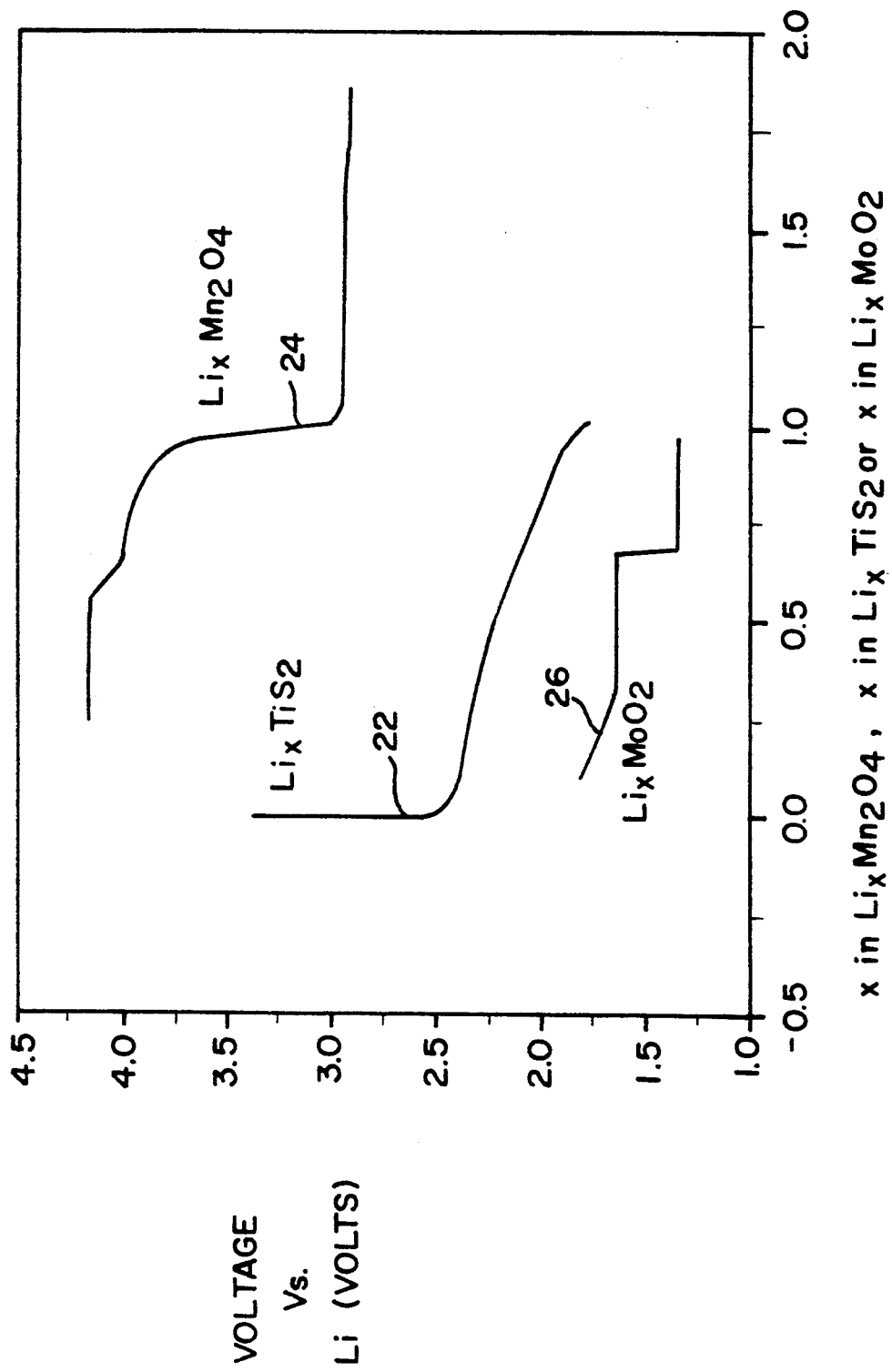
FIG. 3 is a coulometric titration curve for a mixture cathode additive compound provided in accordance with the invention.
Figure 4:
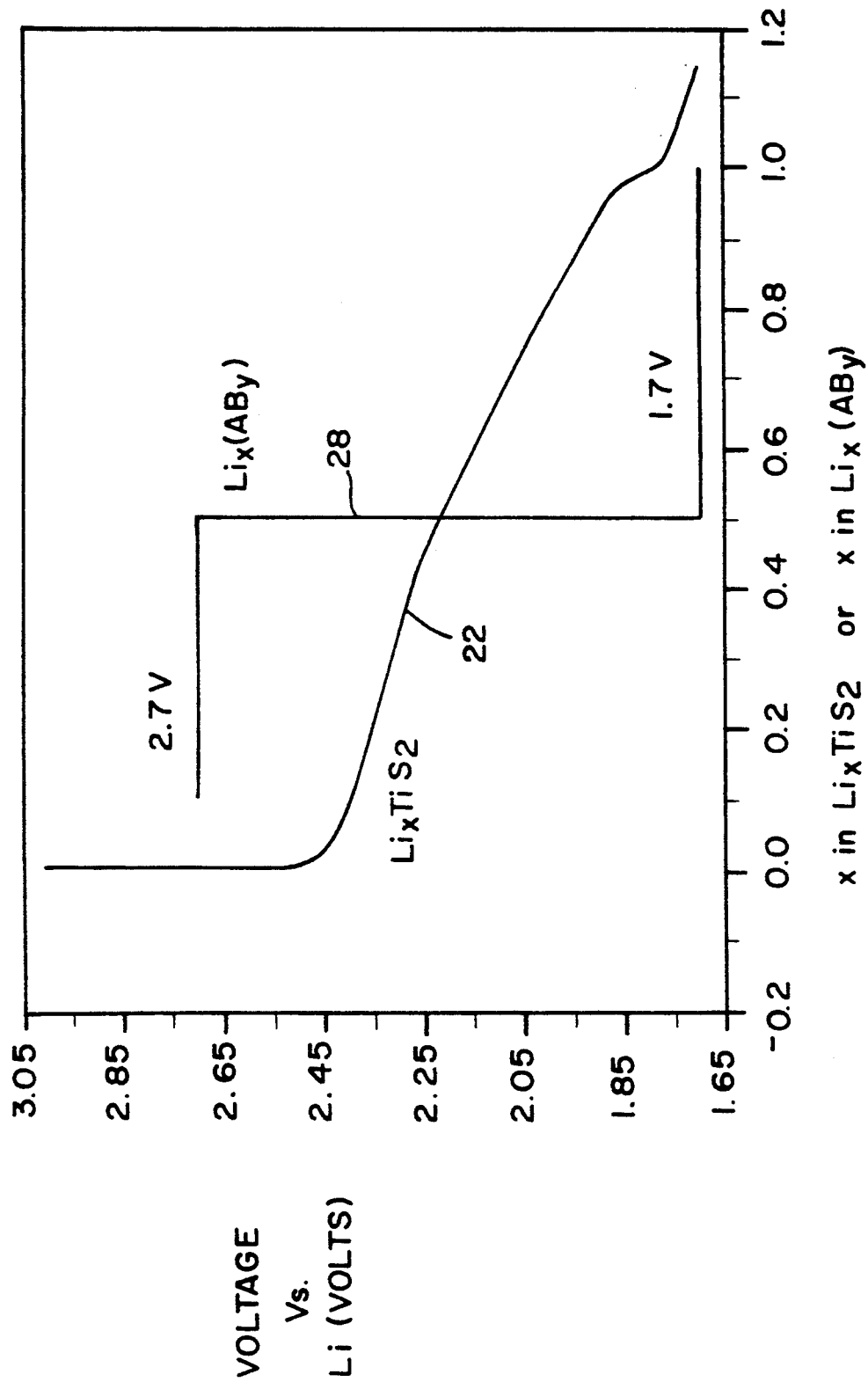
FIG. 4 is a coulometric titration curve for an ideal single component cathode additive.

Referring to FIGS. 3 and 4, the characteristics of preferred cathode additives will be described and exemplary additives set forth. The cathode additives are selected for incorporating directly into the cathode of a secondary, i.e. rechargeable, lithium cell. The base cathode material, such as $TiS_2$, is a powder, and the cathode additive is also a powder. During fabrication of the battery cell, the additive powder is merely mixed with the base cathode powder. To properly prevent overcharging, the cathode additive operates to produce an upper voltage plateau which is slightly higher than a charge cutoff voltage of the base cathode material of the secondary lithium cell. Considering, for example, a lithium cell of the type Li—$TiS_2$, which has a recommended upper charge cutoff voltage of 2.7 volts, a suitable cathode additive provides an upper voltage plateau of 2.7 volts or slightly higher.

To prevent overdischarging, the cathode additive operates to provide a lower voltage plateau which is slightly lower than a discharge cutoff voltage of the cathode material. Thus, for the Li—$TiS_2$ lithium cell, which has a discharge voltage cutoff of approximately 1.7 volts, the additive provides a lower voltage plateau of approximately 1.7 volts or slightly less.

A suitable cathode additive having the above-described characteristics is a mixture of $Li_xMn_2O_4$ and $Li_xMoO_2$. As indicated above, the x indicates a range of lithium titration which essentially sets forth the ratio of $MoO_2$ or $Mn_2O_4$ molecules to $LiMoO_2$ and $LiMn_2O_4$ molecules, respectively. FIG. 3 illustrates a coulometric titration curve of lithium with respect to the $Li_xMn_2O_4$ and $Li_xMoO_2$ compounds. FIG. 3 also provides the coulometric titration curve of lithium with respect to the Li—$TiS_2$ cathode. As can be seen from FIG. 3, maximum titration of lithium into $TiS_2$, occurs with one lithium per $TiS_2$ molecule. At that maximum titration, the lithium cell has a minimum voltage of approximately 1.7 volts. As noted above, this is the discharge cutoff voltage for the Li—$TiS_2$ lithium cell. An attempt to discharge the lithium cell below about 1.5 volts results in an irreversible intercalation of lithium into the Li—$TiS_2$, and a further reduction of electrolyte salts used in the lithium cell. However, with the addition of $Li_xMoO_2$ to the Li—$TiS_2$ cathode, overdischarge protection is achieved. As can be seen from FIG. 3, the titration of lithium into $Li_xMoO_2$ yields a lower voltage plateau of approximately 1.6 volts, i.e., a voltage plateau slightly below the 1.7-volt discharge cutoff voltage of the Li—$TiS_2$ cell. By providing a lower voltage plateau below the cutoff voltage of Li—$TiS_2$, an attempt to lower the voltage of the lithium cell below 1.7 volts is effectuated through titration of lithium into the $Li_xMoO_2$ rather than the Li—$TiS_2$, thus protecting the cathode and electrolytes.

FIG. 3 also provides the titration curve of lithium into $Li_xMn_2O_4$. An attempt to charge the cell to a voltage higher than approximately 3 volts results in oxidative degradation of the electrolyte solvent. As can be seen, $Li_xMn_2O_4$ provides an upper voltage plateau slightly above the recommended 2.7-volt upper charge cutoff voltage of the Li—$TiS_2$ cell. As such, the $Li_xMn_2O_4$ compound prevents an increase in voltage above 2.7 volts from damaging the Li—$TiS_2$ cell. Any attempt to increase the voltage above 2.7 volts is effectuated through titration of lithium into $Li_xMn_2O_4$, thus protecting the entire cell.

Thus, FIG. 3 illustrates the operating voltage range of the Li—$TiS_2$ and the voltage protection window of the additive material. During overcharge (>2.7 volts), the additive material activates to maintain the cell voltage locked at the upper voltage plateau of the additive. During overdischarge (<1.7 volts), the additive also activates to maintain the cell voltage locked at the lower voltage plateau of the additive. The Li—$Li_xMn_2O_4$ system exhibits a voltage plateau around 2.9 volts (versus Li), and the Li—$Li_xMoO_2$ system exhibits a voltage plateau around 1.6 volts (versus Li). An additive containing these two compounds protects the cell from both overcharge and overdischarge.

FIG. 4 provides the coulimetric titration curve of lithium into $TiS_2$, and into an ideal cathode additive compound, representing as $AB_y$. The ideal cathode additive compound not only provides an upper voltage plateau of exactly 2.7 volts and a lower voltage plateau of exactly 1.7 volts, but achieves a sharp transition from the upper voltage to the lower voltage. The upper and lower voltage plateaus are separated by about 1000 millivolts. The upper voltage plateau is slightly higher than the charge cutoff voltage for the cathode material, and the lower voltage plateau is slightly lower than the discharge cutoff voltage of the cathode material. Of course, the ideal additive is capable of undergoing a reversible reaction with lithium, is a good electron and lithium ion conductor, and is stable in combination with the cathode active material and the electrolyte.

Generally, any transition metal oxide or sulfide is a candidate for use as a cathode additive. In particular, transition metal oxides such as $Li_xMn_2O_4$, $Li_xMoO_2$, $Li_xCoO_2$, $Li_xNiO_2$ and $Li_xM_yMn_{(2-y)}O_4$, wherein M is Co, Cr, or Fe are effective. Such cathode additives are effective in a wide variety of secondary lithium cells, including Li—MoS$_2$, Li—NbSe$_3$, Li—V$_2$O$_5$, and Li—MnO$_2$, etc. Preferably, the additive is added to the cathode to a concentration of between 1% and 15% by weight. As described above with respect to FIG. 3, a combination of $Li_2Mn_2O_4$ and $Li_{0.1}MoO_2$ provides an effective overcharge and overdischarge production for Li—TiS$_2$ lithium cells. Any of the cathode additives described herein may be effective in a single cell lithium battery. However, these additives are particularly desirable in multicell lithium batteries wherein the additive is added to the cathode of each cell of the multicell battery.

Although illustrated with respect to Li—TiS$_2$ lithium systems, suitable cathode additives can be selected for protecting other secondary lithium systems such as Li—MoS$_2$, Li—NbSe$_3$, Li—V$_2$O$_5$, Li—MnO$_2$, and Li$_x$C—Li$_x$CoO$_2$.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

We claim:

1. In a secondary lithium cell susceptible to overcharging or overdischarging, the improvement being:

a cathode additive for incorporating into a cathode of the cell, the cathode having a charge cutoff voltage and a discharge cutoff voltage, the cathode additive yielding an upper voltage plateau within the cell upon the application of an overcharge voltage to the cell, said upper voltage plateau being slightly higher than the charge cutoff voltage of the cathode and yielding a lower voltage plateau within the cell upon the application of an overdischarge voltage to the cell, said lower voltage plateau being slightly lower than the discharge cutoff voltage plateau of the cathode.

2. The improvement of claim 1, wherein the additive is a transition metal oxide.

3. The improvement of claim 1, wherein the additive is a sulfide.

4. The improvement of claim 2, wherein the cathode additive is selected from a group consisting of $Li_xMn_2O_4$, $Li_xMoO_2$, $Li_xCoO_2$, $Li_xNiO_2$, and $Li_xM_yMn_{(2-y)}O_4$, wherein M is Co, Cr, or Fe.

5. The improvement of claim 1, wherein the cathode additive is a mixture of $Li_2Mn_2O_4$ and $Li_{0.1}MoO_2$.

6. The improvement of claim 1, wherein the secondary lithium cell is selected from a group consisting of Li—TiS$_2$, Li—MoS$_2$, Li—NbSe$_3$, Li—V$_2$O$_5$, Li—MnO$_2$, and Li$_x$C—Li$_x$CoO$_2$.

7. The improvement of claim 1, wherein the secondary lithium cell is a liquid electrolyte cell.

8. The improvement of claim 1, wherein the secondary lithium cell is a solid state cell.

9. The improvement of claim 8, wherein the secondary lithium cell is a polymeric electrolyte cell.

10. The improvement of claim 1, wherein the upper and lower plateaus are separated by at least 1000 millivolts.

11. The improvement of claim 1, wherein the additive is an electron and lithium ion conductor.

12. The improvement of claim 1, wherein the additive is a single compound additive which creates a sharp transition between the upper and lower voltage plateaus.

13. The improvement of claim 1, wherein the additive is incorporated into the cathode to a concentration of less than 15% by weight.

14. In a multicell rechargeable lithium battery susceptible to over-charging and overdischarging, the improvement being:

a cathode additive for incorporating into a cathode of each cell of the multicell battery, said cathode additive selected from a group consisting of $Li_xMn_2O_4$, $Li_xMoO_2$, $Li_xCoO_2$, $Li_xNiO_2$, and $Li_xM_yMn_{(2-y)}O_4$, wherein M is Co, Cr, or Fe, said secondary lithium cell being of a type selected from a group consisting of Li—TiS$_2$, Li—MOS$_2$, Li—NbSe$_3$, Li—V$_2$O$_5$, Li—MnO$_2$, and Li$_x$C—Li$_x$CoO$_2$, each cathode having a charge cutoff voltage and a discharge cutoff voltage, the cathode additive yielding an upper voltage plateau within each respective cell upon the application of an overcharge voltage to the respective cell, said upper voltage plateau being slightly higher than the charge cutoff voltage of the cathode of the respective cell and yielding a lower voltage plateau within each respective cell upon the application of an over-discharge voltage to the respective cell, said lower voltage plateau being slightly lower than the discharge cutoff voltage plateau of the cathode of the respective cell.

15. The improvement of claim 14, wherein the cathode additive is a mixture of $Li_2Mn_2O_4$ and $Li_{0.1}MoO_2$.

16. The improvement of claim 14, wherein the secondary lithium cell is a solid state cell.

17. The improvement of claim 16, wherein the secondary lithium cell is a polymeric electrolyte cell.

18. The improvement of claim 14, wherein the upper and lower plateaus are separated by at least 1000 millivolts.

19. The improvement of claim 14, wherein the additive is an electron and lithium ion conductor.

20. The improvement of claim 14, wherein the additive is a single compound additive which creates a sharp transition between the upper and lower voltage plateaus.

21. The improvement of claim 14, wherein the additive is incorporated into the cathode to a concentration of less than 15% by weight.

22. In a multicell rechargeable solid state lithium battery susceptible to over-charging and overdischarging, the improvement being:

a cathode additive for incorporating into a cathode of each cell of the multicell battery, said cathode additive being a mixture of $Li_2Mn_2O_4$ and $Li_{0.1}MoO_2$, said secondary lithium cell being a Li—$TiS_2$ cell, each cathode having a charge cutoff voltage of about 2.7 volts and a discharge cutoff voltage of about 1.7 volts, the cathode additive yielding an upper voltage plateau of about 2.9 volts within each respective cell upon the application of an overcharge voltage to the respective cell, and yielding a lower voltage plateau of about 1.6 volts within each respective cell upon the application of an overdischarge voltage to the respective cell.

* * * * *